(12) United States Patent
Bywaters et al.

(10) Patent No.: US 8,789,274 B2
(45) Date of Patent: Jul. 29, 2014

(54) METHOD AND SYSTEM FOR SERVICING A HORIZONTAL-AXIS WIND POWER UNIT

(75) Inventors: Garrett L. Bywaters, Waitsfield, VT (US); Trevor H. Cole, Duxbury, VT (US); Adam R. Olsen, East Corinth, VT (US)

(73) Assignee: Northern Power Systems, Inc., Barre, VT (US)

( * ) Notice: Subject to any disclaimer, the term of this patent is extended or adjusted under 35 U.S.C. 154(b) by 392 days.

(21) Appl. No.: 13/240,756

(22) Filed: Sep. 22, 2011

(65) Prior Publication Data
US 2012/0073134 A1    Mar. 29, 2012

Related U.S. Application Data

(60) Provisional application No. 61/385,722, filed on Sep. 23, 2010.

(51) Int. Cl.
*B21K 25/00* (2006.01)
*B23P 15/04* (2006.01)

(52) U.S. Cl.
USPC ........... 29/889.3; 29/889; 29/889.1; 254/278; 254/329

(58) Field of Classification Search
CPC ...................................................... B21D 53/78
USPC .............. 29/889, 889.1, 889.3; 254/278, 329; 416/142
See application file for complete search history.

(56) References Cited

U.S. PATENT DOCUMENTS

| | | | |
|---|---|---|---|
| 2,078,668 A | 4/1937 | Kilgore | |
| 3,708,707 A | 1/1973 | Kranz | |
| 4,315,171 A | 2/1982 | Schaeffer | |
| 4,424,463 A | 1/1984 | Musil | |
| 4,769,567 A | 9/1988 | Kurauchi et al. | |
| 4,990,809 A | 2/1991 | Artus et al. | |
| 5,196,751 A | 3/1993 | Spirk | |

(Continued)

FOREIGN PATENT DOCUMENTS

| | | |
|---|---|---|
| CH | 75705 | 9/1917 |
| DE | 3546226 A1 | 7/1986 |

(Continued)

OTHER PUBLICATIONS

"Cogging Torque Minimization Technique for Multiple-Rotor, Axial-Flux, Surface-Mounted-PM Motors: Alternating Magnet Pole-Arcs in Facing Rotors," by Metin Aydin, Ronghai Qu, and Thomas A. Lipo, Industry Applications Conference, 38th IAS Annual Meeting, Oct. 12-16, 2003.

(Continued)

*Primary Examiner* — Richard Chang
(74) *Attorney, Agent, or Firm* — Downs Rachlin Martin PLLC

(57) ABSTRACT

A method and system for attaching a service device to a wind turbine of a wind power unit, using the wind turbine to rotate the service device into one or more service positions, and using the service device to perform servicing on the wind power unit. In some embodiments, a blade of the wind turbine is removed and the service device is mounted in its place. In other embodiments, the service device is mounted to a device mount approximately in a saddle region between adjacent blades. In one example, the service device is a crane. In another example, the service device is a stator module installation/removal tool.

23 Claims, 11 Drawing Sheets

(56) References Cited

U.S. PATENT DOCUMENTS

| | | | |
|---|---|---|---|
| 5,675,196 | A | 10/1997 | Huang et al. |
| 5,844,341 | A | 12/1998 | Spooner et al. |
| 6,093,984 | A | 7/2000 | Shiga et al. |
| 6,265,804 | B1 | 7/2001 | Nitta et al. |
| 6,321,439 | B1 | 11/2001 | Berrong et al. |
| 6,717,323 | B1 | 4/2004 | Soghomonian et al. |
| 6,777,850 | B2 | 8/2004 | Harada et al. |
| 6,781,276 | B1 | 8/2004 | Stiesdal et al. |
| 6,819,016 | B2 | 11/2004 | Houle et al. |
| 6,844,656 | B1 | 1/2005 | Larsen et al. |
| 7,113,899 | B2 | 9/2006 | Shah et al. |
| 7,183,689 | B2 | 2/2007 | Schmidt et al. |
| 7,808,136 | B2 | 10/2010 | Knauff |
| 8,083,212 | B2 * | 12/2011 | Numajiri et al. .............. 254/278 |
| 2002/0074887 | A1 | 6/2002 | Takano et al. |
| 2002/0163272 | A1 | 11/2002 | Larsson et al. |
| 2006/0131985 | A1 | 6/2006 | Qu et al. |
| 2006/0279160 | A1 | 12/2006 | Yoshinaga et al. |
| 2008/0115347 | A1 | 5/2008 | Majernik et al. |
| 2008/0197742 | A1 | 8/2008 | Vollmer |
| 2008/0309189 | A1 | 12/2008 | Pabst et al. |
| 2009/0026858 | A1 | 1/2009 | Knauff |
| 2009/0091210 | A1 | 4/2009 | Bade et al. |
| 2009/0129931 | A1 | 5/2009 | Stiesdal |
| 2009/0172934 | A1 | 7/2009 | Mall et al. |
| 2009/0261668 | A1 | 10/2009 | Mantere |
| 2012/0073118 | A1 | 3/2012 | Bywaters et al. |
| 2012/0074797 | A1 | 3/2012 | Petter et al. |

FOREIGN PATENT DOCUMENTS

| | | |
|---|---|---|
| DE | 19905748 A1 | 8/1999 |
| DE | 19920309 A1 | 11/1999 |
| DE | 10027246 C1 | 10/2001 |
| DE | 102008063783 A1 | 6/2010 |
| EP | 938181 A1 | 8/1999 |
| EP | 1422806 A2 | 5/2004 |
| EP | 1458080 A1 | 9/2004 |
| EP | 1988282 A2 | 11/2008 |
| EP | 2072814 A2 | 6/2009 |
| EP | 2131475 A2 | 12/2009 |
| EP | 2163528 A1 | 3/2010 |
| EP | 2182570 A1 | 5/2010 |
| EP | 2187506 A1 | 5/2010 |
| EP | 2320080 A1 | 5/2011 |
| ES | 2233146 A1 | 6/2005 |
| JP | 53051407 A | 5/1978 |
| JP | 1231645 A | 9/1989 |
| JP | 4289759 A | 10/1992 |
| JP | 11335074 A | 12/1999 |
| JP | 2004289919 A | 10/2004 |
| JP | 2005210790 A | 8/2005 |
| JP | 2009131030 A | 6/2009 |
| WO | 0060719 A1 | 10/2000 |
| WO | 0121956 A1 | 3/2001 |
| WO | 2004017497 A1 | 2/2004 |
| WO | 2006032969 A2 | 3/2006 |
| WO | 2006045772 A1 | 5/2006 |
| WO | 2008014584 A1 | 2/2008 |
| WO | 2008021401 A2 | 2/2008 |
| WO | 2009112887 A1 | 9/2009 |
| WO | 2010024510 A1 | 3/2010 |
| WO | 2011031165 A1 | 3/2011 |
| WO | PCT/US2011/052885 | 1/2012 |
| WO | PCT/US2011/052883 | 2/2012 |
| WO | PCT/US2011/052882 | 3/2012 |
| WO | PCT/US2011/052893 | 9/2012 |

OTHER PUBLICATIONS

"Nature and Measurements of Torque Ripple of Permanent-Magnet Adjustable-Speed Motors," by John S. Hsu, Brian P. Scoggins, Matthew B. Scudiere, et al., Industry Applications Convference, 1995, 30th IAS Annual Meeting, Oct. 8-12, 1995.

"Design Techniques for Reducing the Cogging Torque in Surface-Mounted PM Motors," by Bianchi, N. et al., IEEE Transactions on Industry Applications, Sep./Oct. 2002, 1259-1265, vol. 38, No. 5.

Oxford English Dictionary, Definition of "integra," Mar. 17, 2013.

U.S. Appl. No. 13/240,768, Mar. 15, 2013, Office Action.

U.S. Appl. No. 13/240,768, filed Sep. 22, 2011.

U.S. Appl. No. 13/240,779, filed Sep. 22, 2011.

U.S. Appl. No. 13/240,731, filed Sep. 22, 2011.

U.S. Appl. No. 13/240,788, filed Sep. 22, 2011.

U.S. Appl. No. 13/240,731, May 30, 2013, Office Action.

U.S. Appl. No. 13/240,768, Jun. 25, 2013, Response to Office Action.

U.S. Appl. No. 13/240,768, Aug. 6, 2013, Final Office Action.

U.S. Appl. No. 13/240,731, Apr. 9, 2013, Restriction Requirement.

U.S. Appl. No. 13/240,731, May 9, 2013, Response to Restriction Requirement.

Response to Final Office Action dated Oct. 25, 2013, in related U.S. Appl. No. 13/240,768, filed Sep. 22, 2011.

RCE dated Oct. 25, 2013, in related U.S. Appl. No. 13/240,768, filed Sep. 22, 2011.

Amendment and Response to Office Action dated Sep. 30, 2013, in related U.S. Appl. No. 13/240,731, filed Sep. 22, 2011.

* cited by examiner

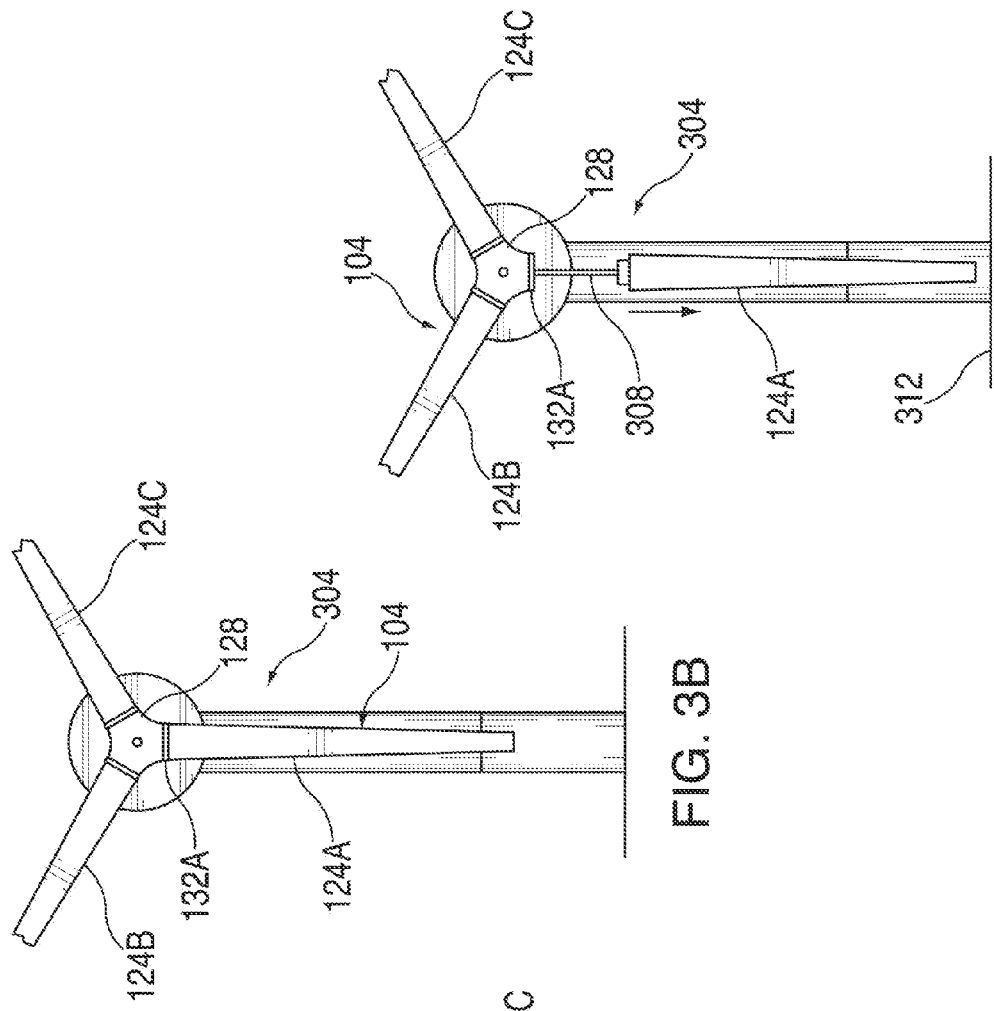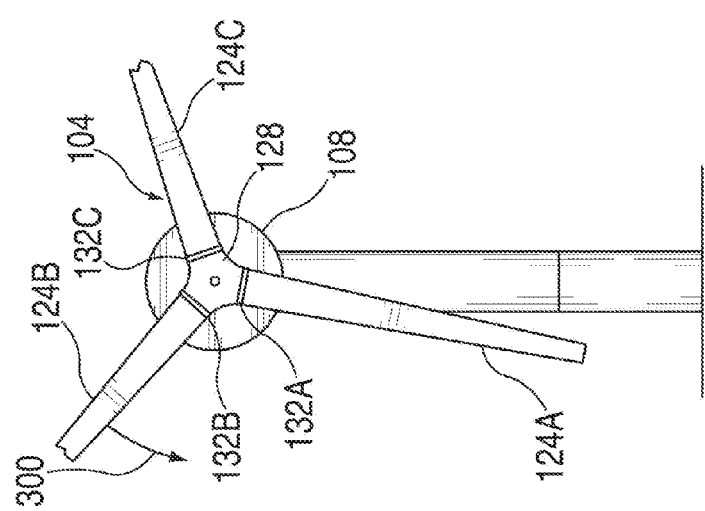

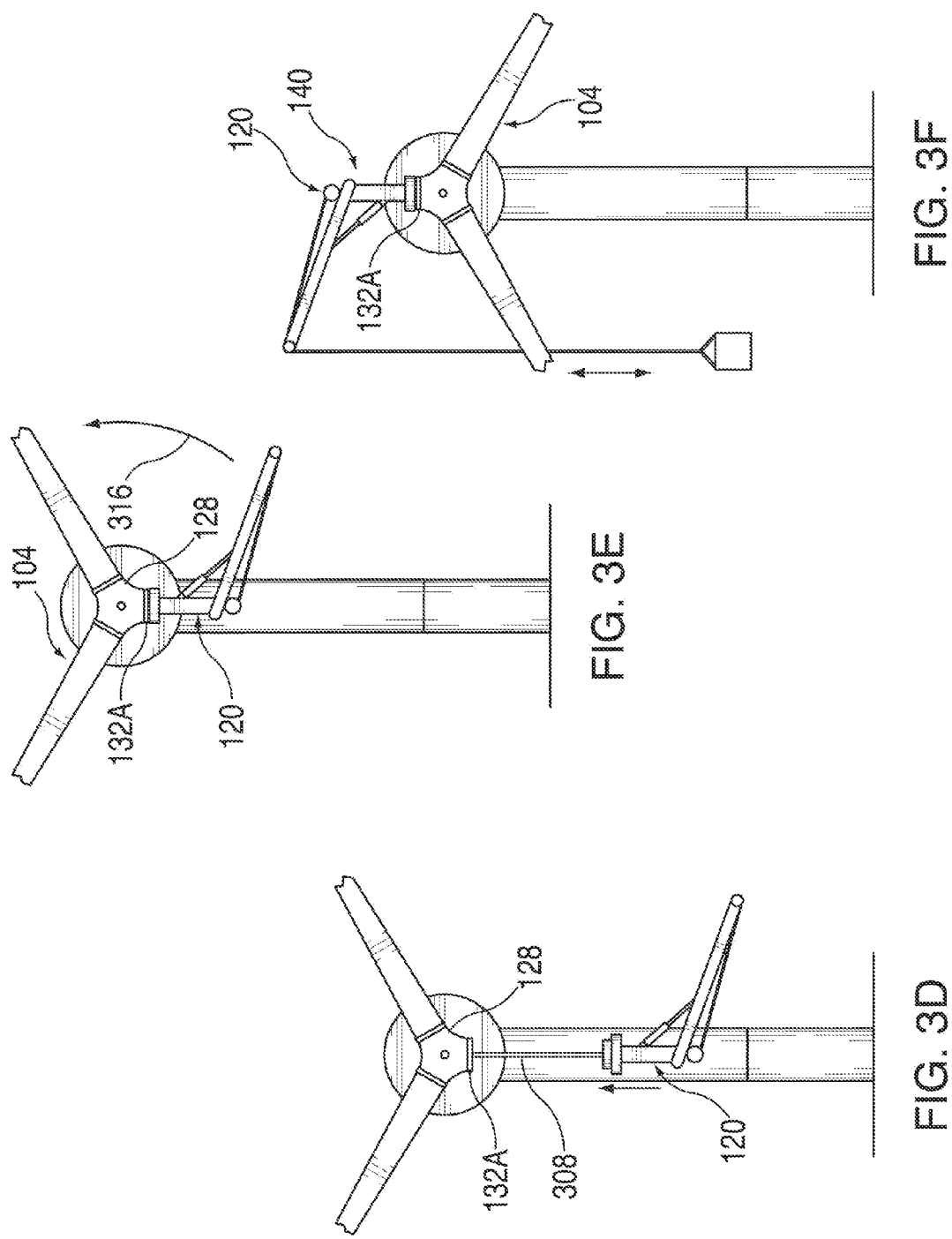

METHOD AND SYSTEM FOR SERVICING A HORIZONTAL-AXIS WIND POWER UNIT

RELATED APPLICATION DATA

This application is a nonprovisional of U.S. Provisional Application No. 61/385,722, filed on Sep. 23, 2010, and titled "Method and System for Servicing a Horizontal-Axis Wind Power Unit," which is incorporated herein by reference in its entirety.

TECHNICAL FIELD

The present disclosure generally relates to the field of wind power units. In particular, the present disclosure is directed to a method and system for servicing a wind power unit.

BACKGROUND

Wind power units (WPUs), which generate electrical power from the energy in wind, continue to increase in importance as alternative, or "renewable," energy sources. Like many machines, WPUs require periodic maintenance and servicing over their service lives. The turbine and generator of a horizontal-axis WPU are typically supported at the top of a tall tower, not only to provide clearance for the turbine blades, but also to place the turbine high off the ground, water or other surface below where wind speeds are characteristically higher. Because of this location, delivery of service equipment and replacement parts to WPUs can be expensive and technically challenging. The expense and challenge are often further increased in the case of WPUs located very remotely and/or on difficult terrain, such as on hilltops and mountain ridgelines.

SUMMARY OF THE DISCLOSURE

In one implementation, the present disclosure is directed to a method including lifting a service device to a hub of a horizontal-axis wind turbine; mounting the service device to the hub; rotating the hub to move the service device to a rotational service position; and immobilizing the rotor hub so that the service device is fixed in the rotational service position.

In another implementation, the present disclosure is directed to a method for in-situ servicing of a generator of a horizontal-axis wind power unit. The method includes lifting a service device to a wind-turbine hub of the horizontal-axis wind power unit; mounting the service device to the wind-turbine hub; rotating the wind-turbine hub to move the service device to a rotational service position; immobilizing the wind-turbine hub so that the service device is fixed in the rotational service position; and servicing the generator using the service device.

In still another implementation, the present disclosure is directed to a wind power unit having a wind turbine hub and being configured for use with a service device that mounts to the wind turbine hub. The wind power unit includes a service device mount on the wind turbine hub; a lifting system for lifting service device to the service device mount; and a system controller responsive to commands from a remote control unit so as to control rotation of the wind turbine to: position the service device mount at a service device lifting position; and once the service device is secured to the service device mount, position the service device at one or more service positions different from the service device lifting position.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 3A-3F are front elevational views of the WPU of FIGS. 1 and 2 illustrating the installation and positioning of the boom-type crane;

DETAILED DESCRIPTION

Disclosed herein are methods and systems for in-situ servicing, installation, and/or dismantling of a horizontal-axis wind power unit (WPU). As is well-known in the art, a horizontal-axis WPU includes a number of components, including a horizontal-axis wind turbine and an electrical generator driven by the wind turbine. The wind turbine can have either a direct-drive or a geared, indirect-drive drivetrain. The wind turbine and generator are both mounted to, and supported by, a suitable support structure at a location relatively high above the underlying surface. Typically, a horizontal-axis wind turbine includes a hub that supports one or more (typically two or three) airfoils, or "blades," mounted to the hub.

The disclosed methods and systems include the concepts of securing a service device to the wind turbine, for example to the hub of the wind turbine, and positioning the service device at one or more desired service locations by rotating the wind turbine to each of the desired locations. When the service device is in a service location, it can be operated to perform one or more useful functions for servicing, installing, and/or removing one or more components of the WPU, for example, the generator and other large components. As will be shown in the following examples, the methods and systems implementing the broad concepts of the present disclosure are varied not only in terms of where and how a service device is secured to a wind turbine, but also as to the types of service device that can be used with the concepts. Indeed, while a number of particular examples are presented below to illustrate the breadth of the disclosed concepts, those skilled in the art will appreciate and understand the large number of variants that are possible and fall within the broad scope of the present disclosure after reading the entire disclosure.

Figure 1:
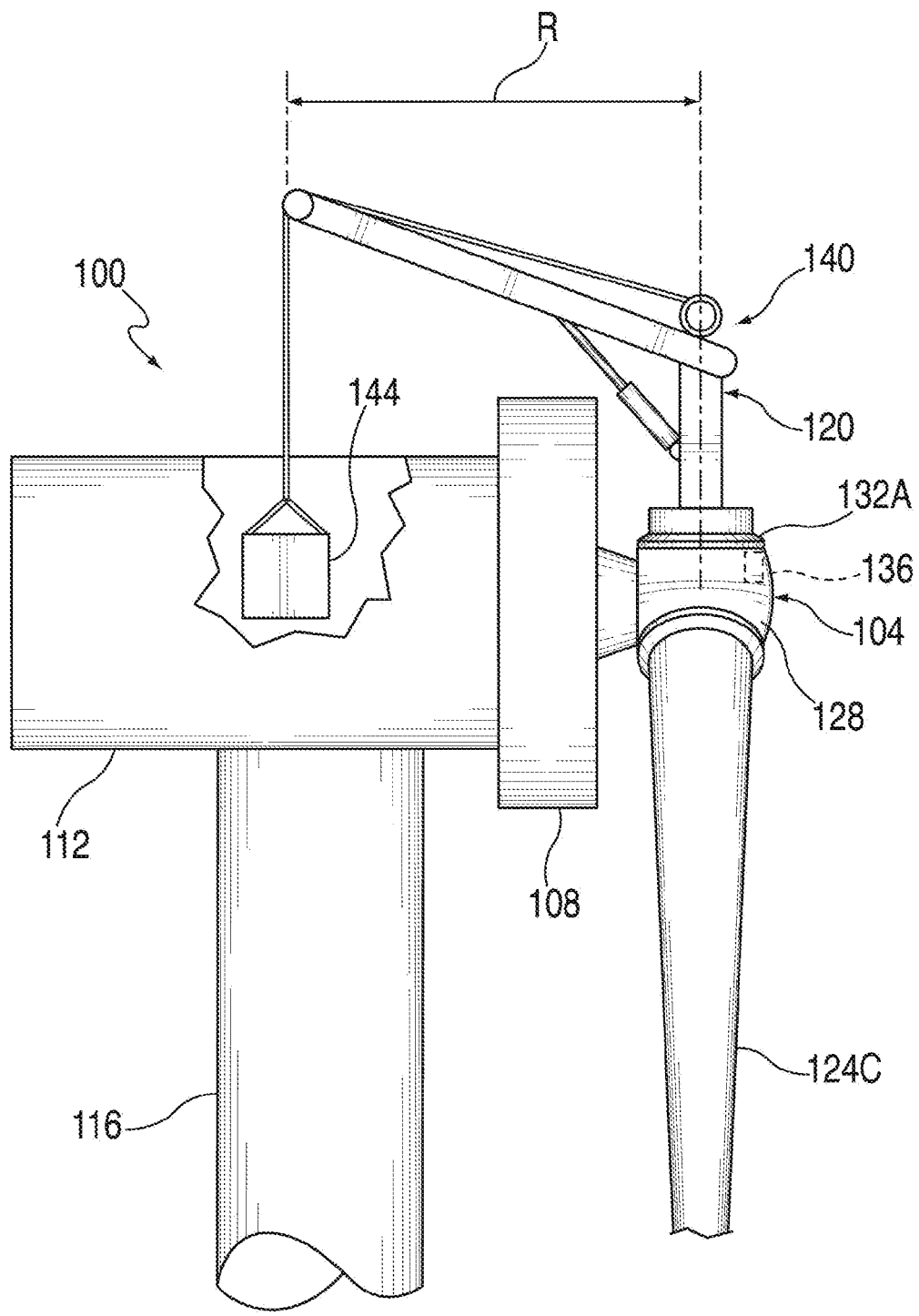
FIG. 1 is a side elevational/cross-sectional partial view of a wind power unit (WPU) having a boom-type crane attached to the wind turbine in accordance with concepts of the present disclosure.

FIGS. 1-3F illustrate a first example implementing broad concepts mentioned above. FIG. 1 depicts a horizontal-axis, direct-drive, pitch-control-type WPU 100 that includes a three-bladed horizontal-axis wind turbine 104 (see, e.g., FIG. 3A for a frontal view of the turbine), a generator 108, and a nacelle 112, all mounted to a support tower 116. For illustrating the scale of this example, WPU 100 can be assumed to be at least a 2 megawatt unit in which wind turbine 104 has an overall diameter of at least 4 meters and tower 116 has a height of at least 60 meters. That said, those skilled in the art will recognize that the broad concepts of the present disclosure can be used with smaller WPUs without departing from the scope and spirit of the present disclosure. In FIGS. 1, 2 and 3D-E, the service device illustrated is a hoisting device, more specifically in this example, a boom-type crane 120 that is mounted to wind turbine 104 and can be used to lift relatively large or heavy components of WPU 100 to and from various locations atop tower 116.

As mentioned above, wind turbine 104 includes three blades, which are labeled 124A-C in FIGS. 3A-C and are mounted to a hub 128 when the turbine is fully assembled (see, e.g. FIG. 3A). In this example, blades 124A-C are attached to hub 128 via corresponding pitch bearing assemblies 132A-C (see, e.g. FIG. 3A illustrating the blades attached to the hub by the pitch bearing assemblies) that control the pitch of the blades, for example, to optimize performance of, and to inhibit damage to, WPU 100 during high-wind conditions. In this example, each pitch bearing assembly 132A-C is driven independently by a corresponding pitch actuator 136 (only one is shown in FIG. 1 for simplicity), such as a motor and gear mechanism. However, in other embodiments, a single actuator can be used with suitable mechanical linkages so that all blades 124A-C are driven simultaneously by the single actuator. Blade pitch control and corresponding mechanisms for effectuating blade pitch control are well known in the art, such that further explanation of details is not necessary. Those skilled in the art will appreciate the various blade pitch mechanisms that can be implemented under the broad concepts of the disclosure.

As seen in FIG. 1, boom-type crane 120 is attached to pitch bearing assembly 132A after corresponding blade 123A (FIGS. 3A-C) has been removed. Although crane 120 is attached to pitch bearing assembly 132A in this example, it is noted that in other embodiments boom-type crane 120 can be connected to turbine 104 at another location, such as to hub 128, for example, to a mount (not shown) located between adjacent ones of blades 124A-C or to the structure surrounding the pitch bearing assembly or other blade mount. Boom-type crane 120 can be attached to pitch bearing assembly 132A using any conventional attaching methods, including bolting the boom-type crane base to the pitch bearing assembly, among others, depending on the configuration of the bearing assembly. For example, if blade 124A is attached to pitch bearing assembly 132A using bolts, the base of crane 120 can be configured to utilize some or all of the same bolt holes in the pitch bearing assembly used for securing the blade. Those skilled in the art will appreciate the various connection methods and mechanisms that can be implemented under the broad concepts of the disclosure.

Boom-type crane 120, once attached and moved into its service position 140 (here, the twelve-o'clock position), is used to reach various components of WPU 100, such as, for example, generator 108 and parts thereof and components located inside nacelle 112, such as electrical gear 144. The maximum reach R of boom-type crane 120 is, in this example, to a location that is approximately mid-length of nacelle 112, not to mention to and from generator 108 and other parts of the WPU. In some embodiments, maximum reach R is five meters or more. With this reach, boom-type crane 120 can be used to transport components of WPU 100 that are of substantial size and/or weight to and from nacelle 112. After attaching a component within nacelle 112, here electrical gear 144, to boom-type crane 120, an operator (not shown) operates the crane to remove the component from WPU 100 and deposits it elsewhere, such as onto the ground or onto a vehicle (not shown) near the base of tower 116. Boom-type crane 120 can also be used to lift components, supplies, and people from a surface below WPU 100 and deliver any of these to WPU 100 at a desired location. In some embodiments, crane 120 can lift approximately two tons at maximum reach R.

Figure 2:
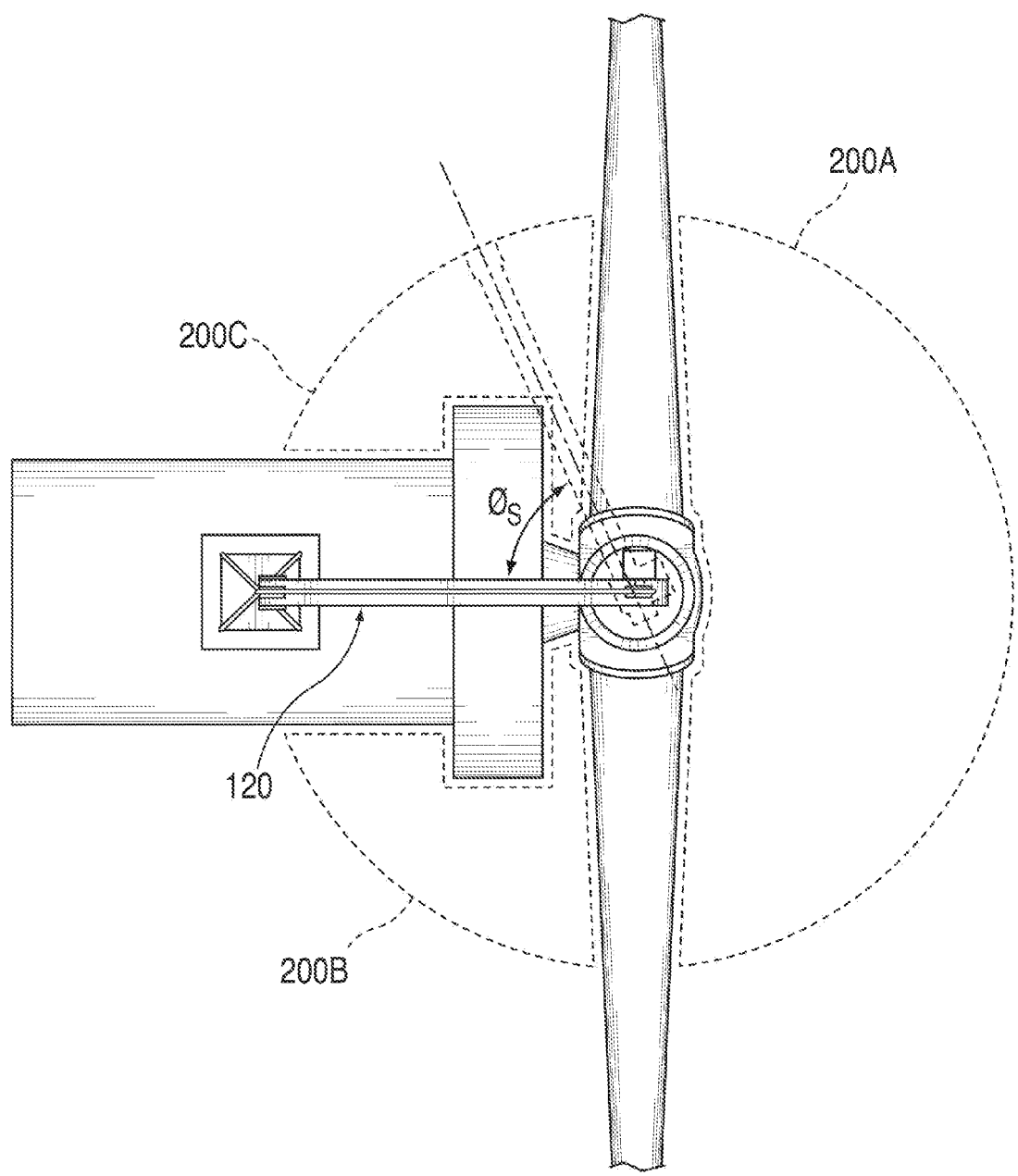
FIG. 2 is a top plan view of the WPU a boom-type crane of FIG. 1.

Referring to FIG. 2, and also to FIG. 1, in order to remove or deliver components, supplies, etc., boom-type crane 120 must be able to move while in its service position 140, i.e., while it is in the twelve-o'clock position on turbine 104 shown in FIG. 3F, to provide one or more clear lifting/lowering zones, such as any one or more of zones 200A-C, free of interferences with WPU for the entire lift-height of the crane. In the example shown, crane 120 is mounted to pitch bearing assembly 132A, and pitch actuator 136 is used to drive the pitch bearing assembly to slew the crane. That said, in other examples the service device may move laterally by translating along a horizontal track (not shown) to achieve the necessary movement to provide the one or more clear lifting/lowering zones. Pitch actuator 136 and pitch bearing assembly 132A are used to slew crane 120 to a maximum angle $\theta_s$. Depending on the configuration of pitch actuator 136 and/or pitch bearing assembly 132A, maximum angle $\theta_s$ can range anywhere from +/−30° to +/−360° or more.

While the present example illustrates the slewing of crane 120 being provided by pitch actuator 136 via pitch bearing assembly 132A, as mentioned above crane 120 could be mounted in another manner, such as to a fixed-blade mount or to a mount located between a pair of adjacent blades. In such cases, for example, crane 120 can be provided with its own slewing mechanism or a separate slewing mechanism can be provided between the crane and mount. Conventional crane slew mechanisms are well-known in the art, such that further description is unnecessary. Prior to using crane 120 for delivering components or supplies to WPU 100, it must be attached to hub 128. FIGS. 3A-F illustrate an example of a method of attaching crane 120 (or any other service device) to bearing assembly 132A and then moving the crane to its service position.

Referring to FIG. 3A, a typical first step is to rotate wind turbine 104 in a desired or necessary direction 300 to move any, or a particular, one of pitch bearing assemblies 132A-C (and corresponding blade 124A-C) to a connection position 304, as shown in FIG. 3B. As seen in FIG. 1, in this example crane 120 is attached to pitch bearing assembly 132A, so this bearing assembly and corresponding blade 124A are rotated into connection position 304. It is noted that if the particular service device at issue does not need any special design considerations, such as a heavy-duty pitch actuator and/or a slew controller that operates on only one of the three pitch bearing assemblies 132A-C, then any one of the pitch bearing assemblies can be used as a mount for the service device. However, if the service device requires a special design consideration that is tied to only a particular one of the three pitch bearing assemblies 132A-C, then that one of the pitch bearing assemblies must be the one rotated to connection position 304. The rotation of wind turbine 104 can be effected in any suitable manner, such as by using generator 108 as a motor, by using a pony motor (not shown) that drives the rotor (not shown) of generator, drive shaft or other rotating component of WPU 100, or by using a manual mechanism, among others. Regarding using generator 108 as a motor, it is noted that related U.S. patent application Ser. No. 13/240,779, titled "METHOD AND SYSTEM FOR MAINTAINING A MACHINE HAVING A ROTOR AND A STATOR", and filed on the same date as the present application, discloses systems and method for using a WPU generator as a precision motor. Any one of those systems and methods could be implemented in WPU 100 for the purposes disclosed herein. The '779 application is incorporated herein by reference for all its teachings of using a WPU generator as a precision motor that are relevant to the present disclosure.

As mentioned above, in this example connection position 304 is substantially the six-o'clock position relative to the plane of wind turbine 104. As described below, the six-o'clock position facilitates the lifting of crane 120 to hub 128. In other embodiments, connection position 304 can be another position that suits the particular configuration of the service device. For example, an alternative connection position 304 could be in a range from the four-o'clock and the eight-o'clock positions. Once pitch bearing assembly 132A and corresponding blade 124A are in connection position 304, wind turbine 104 can be locked into this position, for example, by engaging a mechanical brake system (not shown) of WPU 100 or by engaging some other locking mechanism. After turbine 104 has been locked from rotation in connection position, as illustrated by FIG. 3C, blade 124A is disengaged from pitch bearing assembly 132A and lowered to the ground 312, vehicle, or other location, below WPU 100 using, for example, a winch cable 308. Winch cable 308 may be connected to a permanent winch (not shown) mounted, for example, within nacelle 112 (FIG. 1) or a temporary winch (not shown) mounted in the nacelle or in hub 128.

As illustrated by FIG. 3D, after blade 124A has been safely lowered, winch cable 308 is connected to crane 120, and the crane is lifted into engagement with pitch bearing assembly 132A using the winch cable and corresponding winch. As shown in FIG. 3E, once crane 120 is raised to hub 128, it is mounted to pitch bearing assembly 132A, as previously discussed. Once crane 120 has been securely mounted, wind turbine 104 is unlocked and rotated in the desired, or necessary, direction 316 to move the crane into its service position 140, again, the twelve-o'clock position, as shown in FIG. 3F. The rotation of wind turbine 104 can be effected in any suitable manner, such as by using generator 108 as a motor, by using a pony motor (not shown) that drives the rotor (not shown) of generator, drive shaft or other rotating component of WPU 100, or by using a manual mechanism, among others. When crane 120 is in its service position 140, wind turbine 104 can again be locked as before to hold the crane firmly in that position. When crane 120 is no longer needed, it can be removed and replaced with blade 124A, for example, by essentially reversing the steps illustrated in FIGS. 3B-E.

FIGS. 4A-D illustrate a second example of implementing the broad concepts of raising and attaching a service device 400 (FIGS. 4B-D) to a wind turbine 404 of a WPU 408. In this example, wind turbine 404 includes three blades 412A-C and a hub 416 fitted with a service-device mount 420, here in a saddle region 424 between adjacent blades 412A-B. Those skilled in the art will appreciate that the stages of the method depicted in FIGS. 4A-D are independent of the number of blades connected to the wind turbine. Service-device mount 420 can be either permanently fixed to hub 416 so that it is present even when WPU 408 is operating or temporarily secured to the hub only when needed to support service device 400.

Figure 4A:
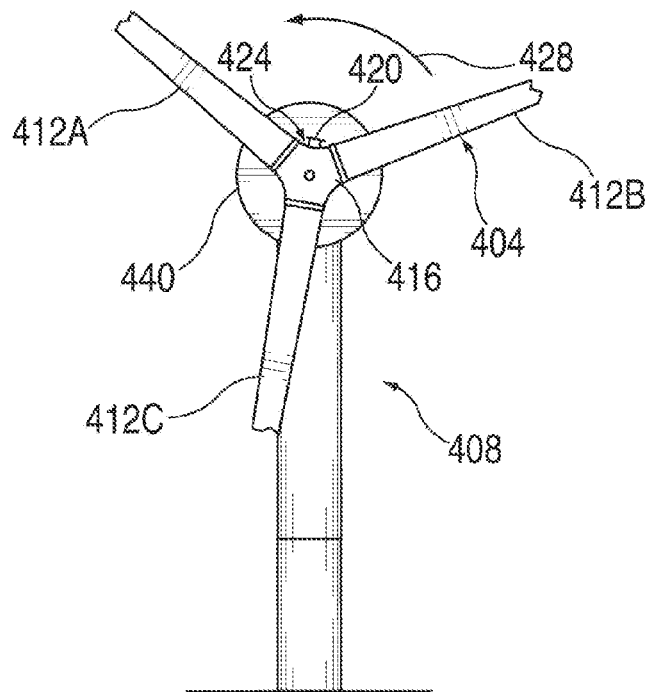
FIGS. 4A-4D are front elevational views of a WPU illustrating the installation and positioning of a service device mounted in the saddle region of the wind turbine hub.
Figure 4B:
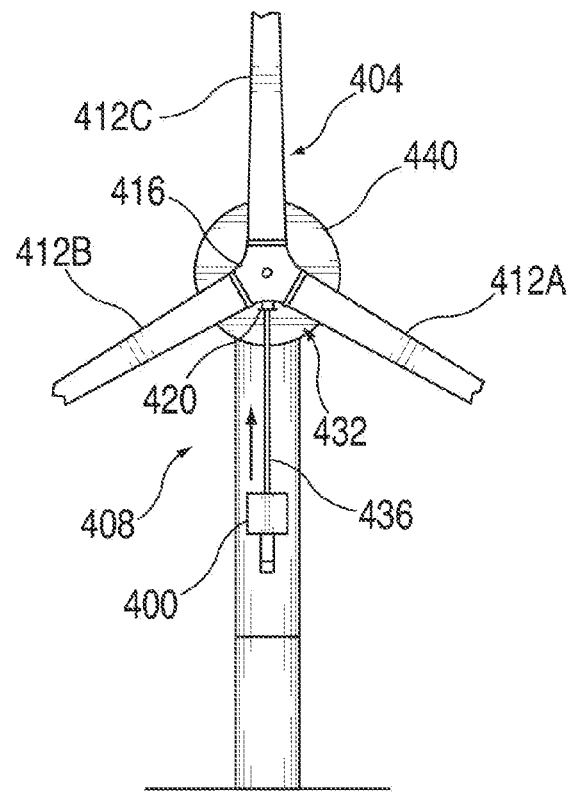
Figure 4C:
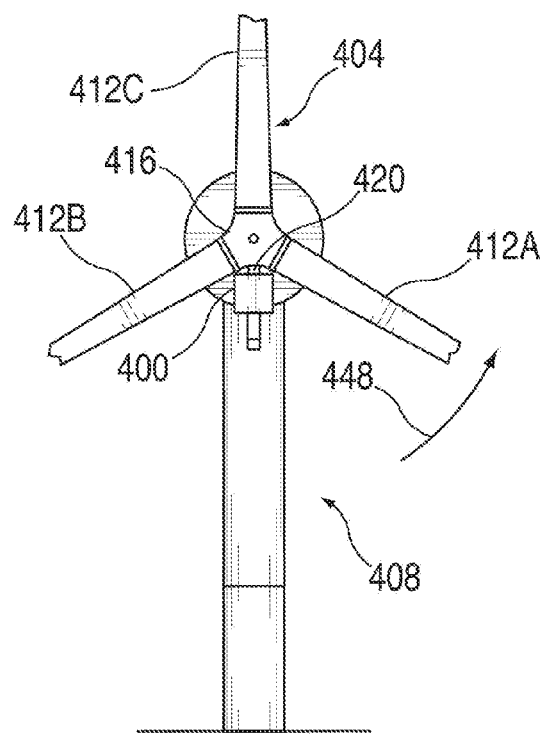
Figure 4D:
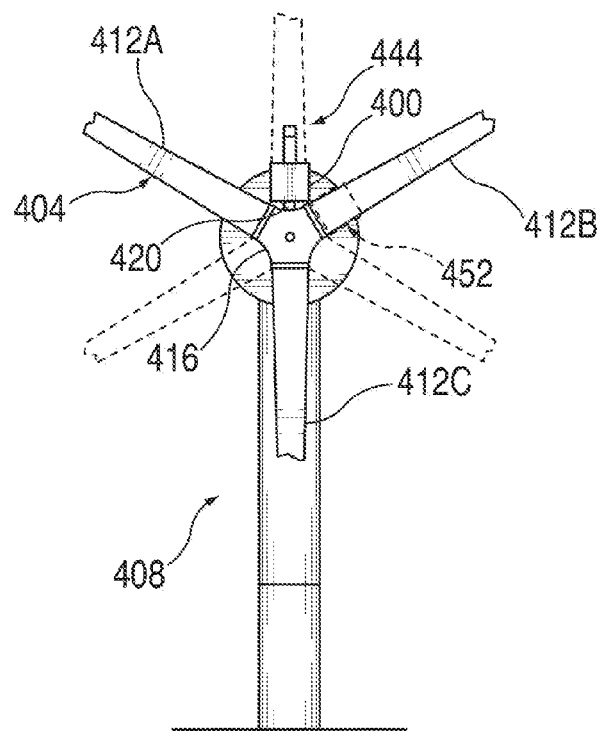

FIG. 4A illustrates a typical first step of rotating wind turbine 404 in a desired or necessary direction 428 to position service device mount 420 in a connection position 432 (FIG. 4B). As shown in FIG. 4B, connection position 432 in this example is approximately at the six o'clock position. As described below, in this example the six-o'clock position facilitates the lifting of service device 400 to hub 416. In other embodiments, connection position 432 can be another position that suits the particular configuration of the service device. For example, an alternative connection position 432 could be in a range from the four-o'clock and the eight-o'clock positions. The rotation of wind turbine 404 can be effected in any suitable manner, such as by using the generator 440 of WPU 408 as a motor, by using a pony motor (not shown) that drives the rotor (not shown) of generator, drive shaft or other rotating component of WPU 100, or by using a manual mechanism, among others. Regarding using generator 440 as a motor, as mentioned above relative to FIGS. 3A-F any of the applicable techniques of the '779 application can be used:

Once service device mount 420 is in connection position 432, wind turbine 404 can be locked into this position, for example, by engaging a mechanical brake system (not shown) of WPU 408 or by engaging some other locking mechanism. After turbine 404 has been locked from rotation in connection position, service device 400 is raised to service device mount 420. In this example, service device 400 is raised to service device mount 420 using a winch cable 436. After service device 400 has been raised, it is secured to service device mount 420 in any suitable manner, such as using mechanical fasters, for example bolts. Mounting methods are well-known, and those skilled in the art will appreciate the various mounting methods that can be used under the broad concepts of the present disclosure. As illustrated in FIGS. 4C-D, after mounting, wind turbine 404 is unlocked and service device 400 is rotated into a service position 444 (FIG. 4D) by rotating the turbine in a desired or necessary direction 448. As before, the rotation of wind turbine 404 can be effected in any suitable manner, such as by using generator 440 as a motor, by using a pony motor (not shown) that drives the rotor (not shown) of generator, drive shaft or other rotating component of WPU 100, or by using a manual mechanism, among others. When service device 400 is in its service position 444, wind turbine 404 can again be locked as before to hold the device firmly in that position. It is noted while service position 444 is shown as being the twelve-o'clock position, it should be appreciated that the service position can be any rotational position needed to perform a particular servicing task or set of tasks. This is illustrated by a second service position 452 in FIG. 4D that is at about a two-o'clock position. More generally, a particular service device can have multiple service positions, as illustrated in one of the following examples. When service device 420 is no longer needed it can be removed, for example, by essentially reversing the steps illustrated in FIGS. 3B-C.

Figure 5:
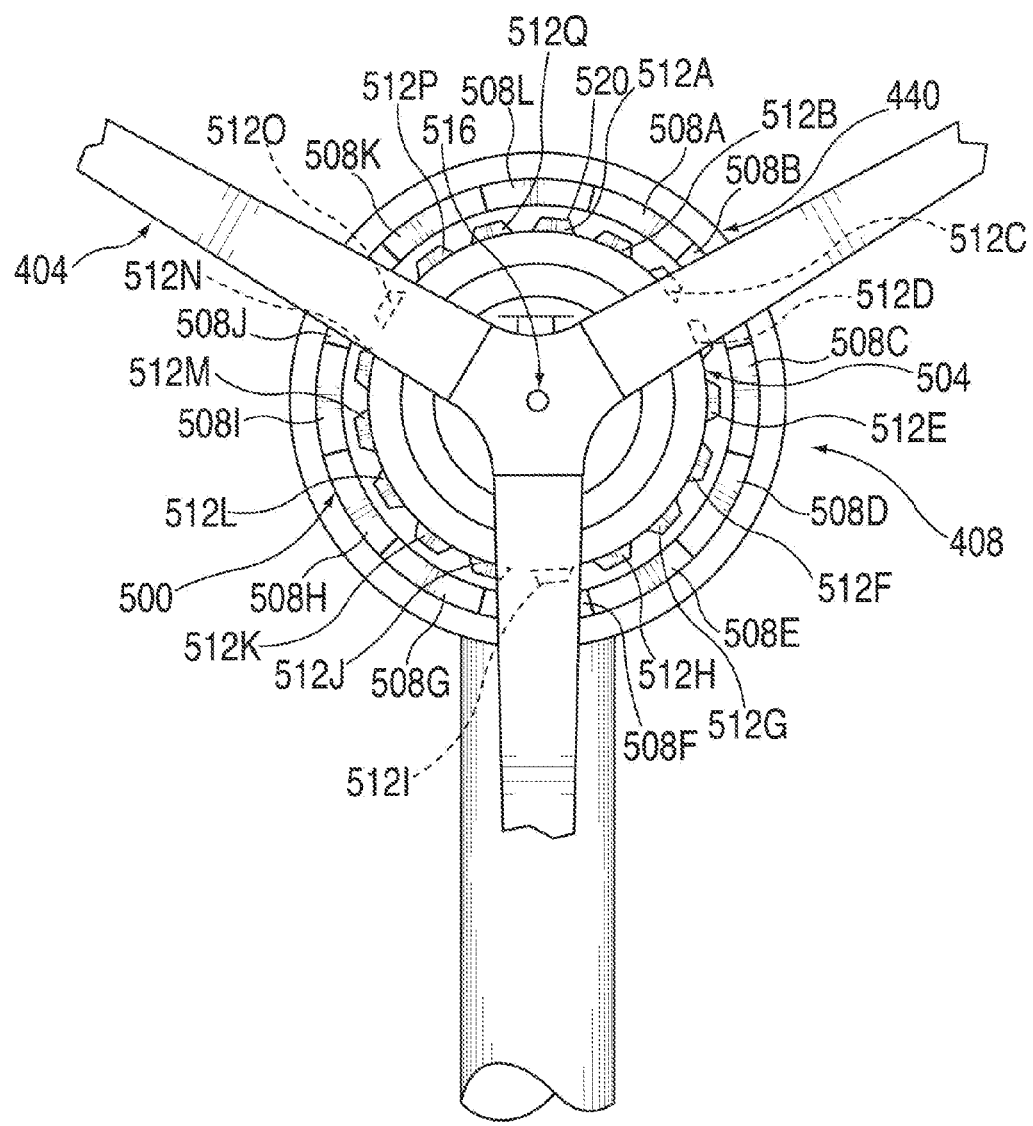
FIG. 5 is an enlarged front elevational partial view of the WPU of FIGS. 4A-4D showing the front cover of the generator removed to expose the generator's rotor and stator.
Figure 6:
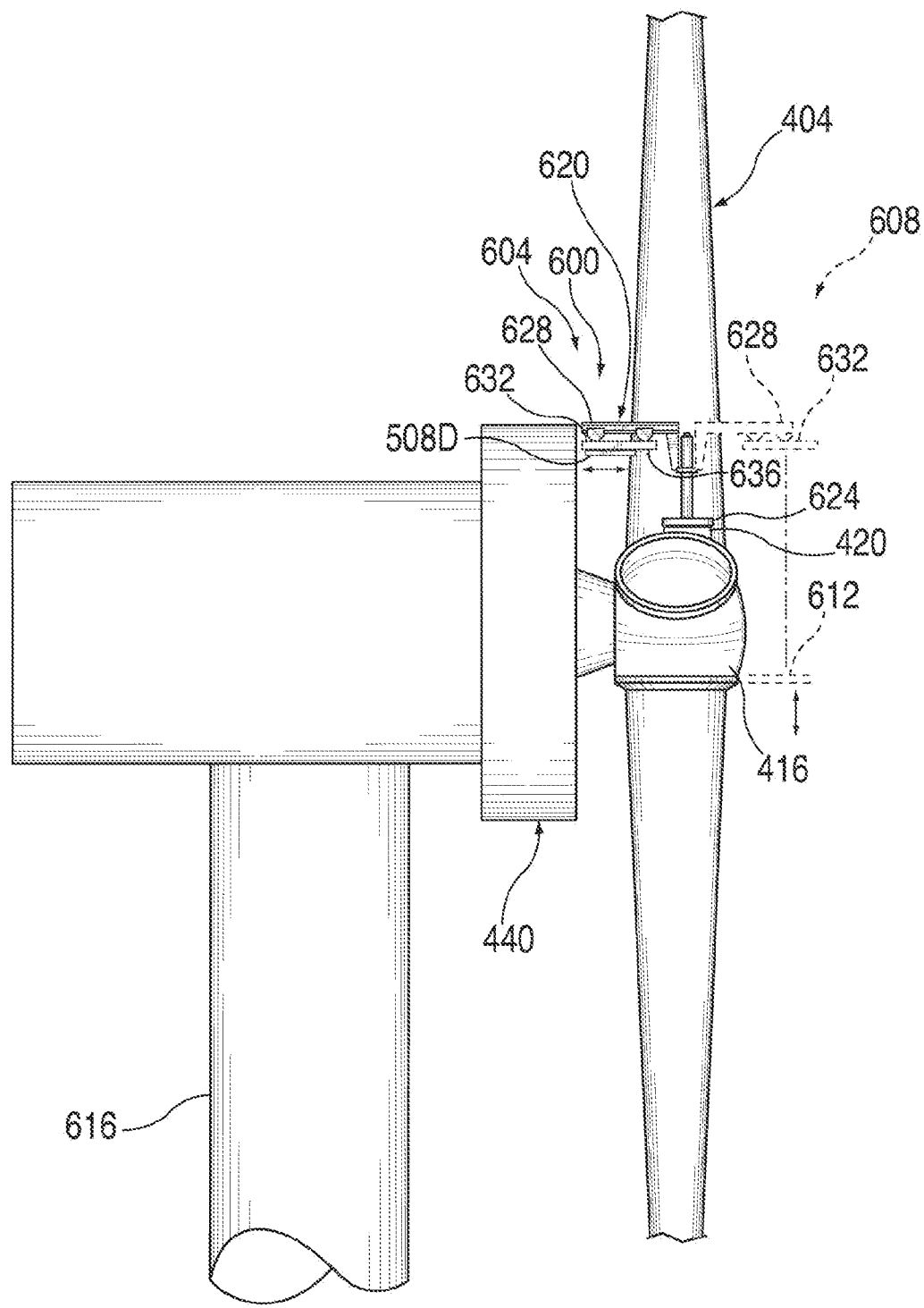
FIG. 6 is an enlarged side elevational partial view of the WPU of FIGS. 4A-D and 5 and a saddle-mounted stator module installation/removal tool, showing one of the blades removed for clarity.
Figure 7:
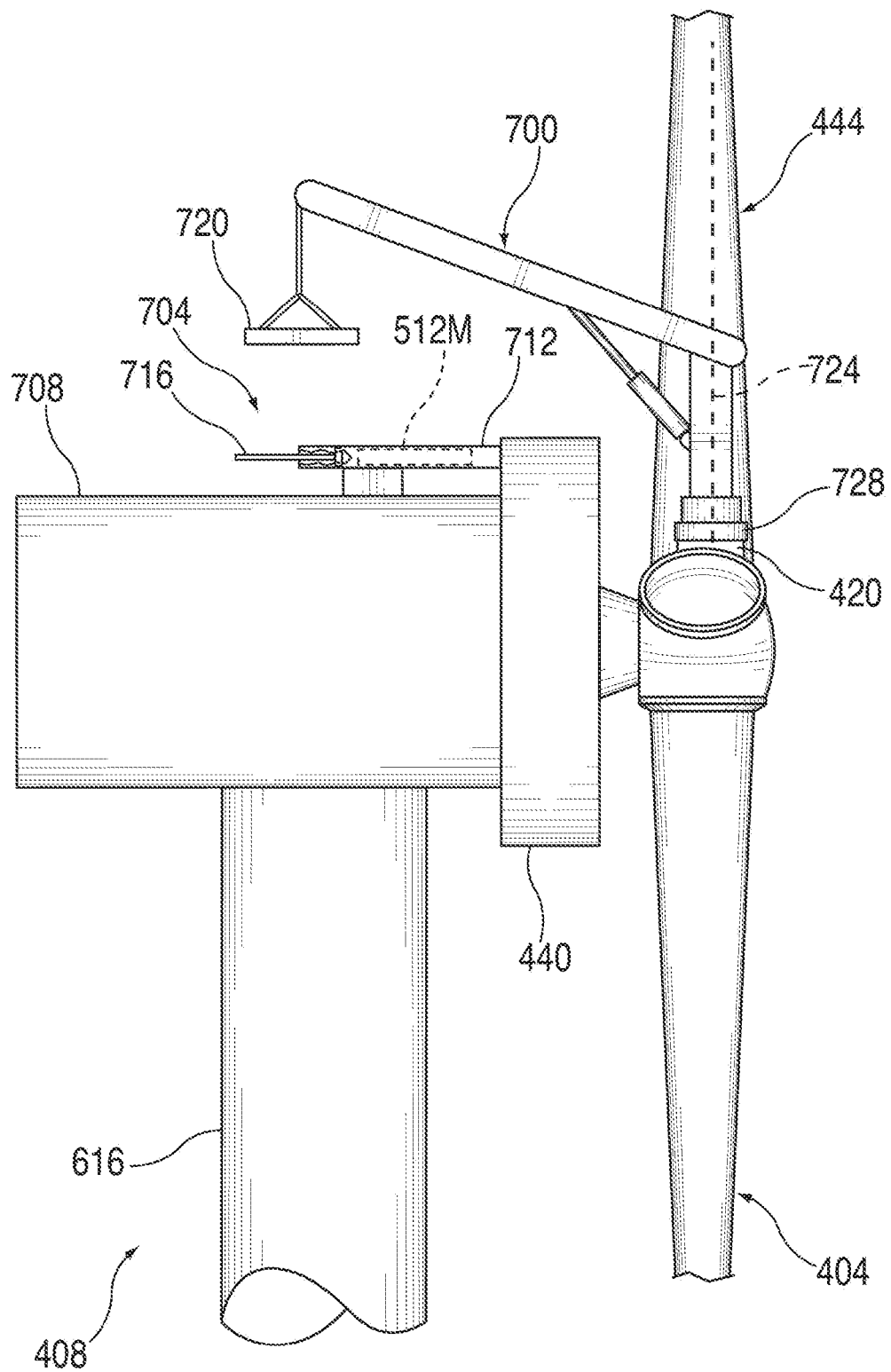
FIG. 7 is an enlarged side elevational partial view of the WPU of FIGS. 4A-D, 5 and 6, showing one of the blades removed for clarity, wherein the WPU has mounted thereto a saddle-mounted crane operating in conjunction with a permanent magnet installation/removal tool for installing and/or removing permanent magnets from/to the generator's rotor.

FIGS. 5-7 illustrate broad concepts of the present disclosure in examples utilizing two differing saddle-mounted service devices to service generator 440. Referring first to FIG. 5, this figure illustrates WPU 408 without a service device and with the front cover of generator 440 removed to expose the stator 500 and rotor 504 of the generator. In this example, generator 440 is a permanent magnet generator that is directly driven by wind turbine 404, and stator 500 and rotor 504 have various features that lend themselves to in-situ servicing, especially in-situ servicing using turbine-mounted service devices as described below. While generator 440 does not need to meet any particular size requirements, concepts disclosed can be implemented with generators 1 megawatt and larger.

More particularly, stator 500 is modular, having a plurality of like stator modules, here, twelve modules 508A-L, each of which is readily removable and replaceable from the front side of generator 440. In one example, each stator module 508A-L includes an iron core (not shown) having a plurality of teeth (extending into and out of the page in FIG. 5), wherein each tooth is surrounded by a winding. Further details of this example stator-module configuration are not needed for an understanding of the broad concepts disclosed herein. That said, further details of this example, as well as other examples, can be found in U.S. patent application Ser. No. 13/240,768, titled "ELECTROMAGNETIC ROTARY MACHINES HAVING MODULAR ACTIVE-COIL PORTIONS AND MODULES FOR SUCH MACHINES" and filed on the same date as the present application, that is incorporated herein by reference for all of its teachings of modular stator design, installation, and removal. While stator modules 508A-L can be any manageable size and weight, in an example weight range each module weighs from about 500 pounds (~2.2 kN) to 2 tons (~8.9 kN) or more.

Rotor 504 has a unique configuration in that it includes a plurality of permanent magnets, here, seventeen magnets 512A-Q, that are readily removable from the rear side of generator 440. In one example, each magnet 512A-Q is held in place in a radial direction relative to the rotational axis 516 of rotor 504 by a corresponding magnet cover 520 (only one of the seventeen covers corresponding to magnet 512A is labeled for simplicity) that allows that magnet to be removed and installed by sliding it in a direction parallel to rotational axis 516. While further details of removable magnet concepts are not needed for those skilled in the art to implement corresponding aspects of the broad concepts of the present disclosure, such details can be found in U.S. patent application Ser. No. 12/543,153, titled "METHOD AND APPARATUS FOR PERMANENT MAGNET ATTACHMENT IN AN ELECTROMECHANICAL MACHINE," and filed on Aug. 18, 2009, that is incorporated by reference herein for all its teachings of magnet covers, slidably installable/removable permanent magnets, and corresponding installation and removal tools.

Referring now to FIG. 6, and also to FIG. 5, FIG. 6 illustrates service device 400 (FIGS. 4B-D) as being a stator module installation/removal tool 600 for installing and removing individual stator modules 508A-L to and from generator 440. In this example, stator module installation/removal tool 600 is also configured for functioning as a crane, including the ability to slew from a first position 604 on the generator-side of wind turbine 404 to a second position 608 on the opposite side of the turbine, for placing and picking removed and new stator modules, such as stator module 612, to, for example, the ground or a vehicle (not shown) near the base of support tower 616. Because stator module installation/removal tool 600 is a particular instantiation of service device 400 of FIGS. 4B-D, it is mounted to service device mount 420 in saddle region 424 of hub 416. FIGS. 4A-D illustrate a method of raising and securing stator module installation/removal tool 600 to wind turbine 404 and positioning the tool into its service positions, of which there are at least twelve possible service positions, one for each of the twelve stator modules 508A-L (FIG. 5).

In a case having twelve replaceable stator modules, there would be a thirteenth service positions if none of the twelve modules is located top-dead-center (i.e., at the twelve-o'clock position) and the stator module installation/removal tool can be slewed only when it is at the twelve-o'clock position. In such as case, after removing a particular stator module with the stator module installation/removal tool located at a non-twelve-o'clock service position, the wind turbine would then be rotated so that the tool is placed in the twelve-o'clock service position, where the tool can then be slewed to a position such as position 608, where it can then be used to lower the removed module to the ground. As those skilled in the art will readily appreciate, the order of events in the removal scenario just mentioned can be reverse for the picking and installing of a replacement stator module.

In this example, stator module installation/removal tool 600 includes a mast-type jib crane 620 mounted to a slew bearing 624 that is secured to device mount 420. Jib crane 620 includes a horizontal jib member 628 that supports a module magazine 632 so that the magazine is movable in a longitudinal direction along the jib member. This longitudinal movability of module magazine 632 allows it to be moved into engagement with stator 500 (FIG. 5) so that it can be temporarily fixed to the stator, for example, by bolting, during an installation/removal operation to provide the necessary stability. The longitudinal movability also allows module magazine 632 to move relative far outboard of hub 416 when stator module installation/removal tool 600 is in position 800 to provide sufficient clearance between the hub and module 612 during placing and picking. Module magazine 632 includes an insertion/withdrawal mechanism 636 that performs, or otherwise assists, with moving any one of stator modules 508A-L (FIG. 5) into and out of stator 500 (FIG. 5). As those skilled in the art will readily appreciate, insertion/withdrawal mechanism 636 can include any suitable automated or manual mechanism for performing those tasks.

Following are examples of how stator module installation/removal tool 600 can be used to remove a particular one of stator modules 508A-L and then install a new module to take the place of the particular module just removed. In these examples: stator module 508D is being replaced; the service position of stator module installation/removal tool 600 for this module is the three-o'clock position; module magazine 632 is initially empty; the tool is initially located at the six-o'clock position; wind turbine 404 is initially locked; and the front generator cover (not shown) has been removed. To begin the process, wind turbine 404 is first unlocked, rotated until stator module installation/removal tool 600 is in the six-o'clock service position, and then relocked into this position. Then module magazine 632 is first moved into contact with stator 500 and then temporarily connected to the stator. Insertion/withdrawal mechanism 636 is then actuated to remove stator module 508D, thereby loading the module into module magazine 632.

After stator module 508D is safely loaded into module magazine 632, the magazine is disconnected from stator 500 and moved away from the stator. Wind turbine 404 is then unlocked, rotated so that stator module installation/removal tool 600 is positioned in the twelve-o'clock position (service position 444 of FIG. 4D) as shown in FIG. 6 and then re-locked. Jib crane 620 is then slewed from first position 604 to second position 608, wherein module magazine 632 is moved outboard of hub 416. After module magazine 632 has been moved sufficiently outboard of hub 416, stator module 508D is lowered and placed on a surface below. Next, a new stator module, here stator module 612, is installed in place of stator module 508D just removed.

While module magazine 632 is still outboard of hub 416, new stator module 612 is picked and raised to the magazine using jib crane 620. Then, module magazine 632 is moved inboard, and jib crane 620 is moved from second position 608 to first position 604. Wind turbine 404 is then unlocked, moved from the twelve-o'clock service position 444 (FIG. 4D) to the six-o'clock service position where stator module 508D was removed, and then re-locked at the six-o'clock service position. After wind turbine 404 has been relocked, module magazine 632, now loaded with new stator module 612, is engaged with and connected to stator 500. Then, insertion/withdrawal mechanism 636 is actuated to push new stator module 612 into stator 500. After new stator module 612 is secured within stator 500, module magazine 632 is disconnected and moved away from the stator. Wind turbine 404 can now be unlocked and rotated as desired, for example, for removing another one of stator modules 508D, for removing of stator installation/removal tool 600 from the wind turbine, or for some other task.

Referring now to FIG. 7, and also to FIG. 5, FIG. 7 illustrates service device 400 (FIGS. 4B-D) as being a boom-type crane 700, which is shown as being used in conjunction with a magnet installation/removal tool 704 to facilitate the installation and removal of individual permanent magnets 512A-Q from rotor 504 (FIG. 5). In this example, magnet installation/removal tool 704 is mounted on nacelle 708, here only temporarily as needed to service generator 440. Magnet installation/removal tool 704 includes a magnet receiver 712 and a magnet insertion/withdrawal mechanism 716 that performs, or otherwise assists, with moving any one of permanent magnets 508A-Q (FIG. 5) into and out of rotor 504 (FIG. 5). In this example, crane 700 is configured for placing and picking removed and new magnets, such as magnet 720, to, for example, the ground or a vehicle (not shown) near the base of support tower 616. Because magnet installation/removal tool 704 is a particular instantiation of service device 400 of FIGS. 4B-D, it is mounted to service device mount 420 in saddle region 424. FIGS. 4A-D illustrate a method of raising and securing magnet installation/removal tool 704 to wind turbine 404 and positioning the tool into its service position, of which there is only one, specifically, the twelve-o'clock position 444. This is so in this example because crane 700 can only be operated to pick and place magnets when the slew axis 724 of slew bearing 728 is vertical.

Following are examples of how magnet installation/removal tool 704 can be used to remove a particular one of permanent magnets 512A-Q and then install a new magnet to take the place of the particular magnet just removed. In these examples: magnet 512M is being replaced; magnet receiver 712 is initially empty; crane 700 is in service position 444 after being positioned there as described relative to FIGS. 4A-D; wind turbine 404 is locked; and the rear generator cover (not shown) has been removed. To begin the process, wind turbine 404 is first unlocked, rotated until magnet 512M is at top-dead-center where magnet installation/removal tool 704 is located, and then relocked into this position. Magnet installation/removal tool 704 is the temporarily connected to rotor 504 of generator 440. Magnet insertion/withdrawal mechanism 716 is then actuated to remove permanent magnet 512M, thereby loading the magnet into magnet receiver 712.

After permanent magnet 512M is safely loaded into magnet receiver 712, magnet installation/removal tool 704 is disconnected from rotor 504. Wind turbine 404 is then unlocked, rotated so that crane 700 is positioned in the twelve o'clock position (service position 444 of FIG. 4D) as shown in FIG. 6 and then re-locked. Crane 700 is then slewed into position as needed to pick magnet 512M from magnet receiver 712. After crane 700 has picked magnet 512M and raised it to a sufficient height to clear any obstructions, the crane is slewed again to one lateral side of WPU 408 or the other, where the crane is operated to lower magnet 512M and place it on a surface below. Next, a new permanent magnet, here permanent magnet 720, is installed in place of magnet 512M just removed.

While crane 700 is still slewed to one lateral side of WPU 408, new magnet 720 is picked and raised to a sufficient height to clear any obstacles on the WPU. Crane 700 is slewed back so that new magnet 720 is positioned over magnet receiver 712 and then operated to place the new magnet onto the magnet receiver. With new magnet 720 now aboard magnet installation/replacement tool 704, wind turbine 404 is then unlocked, rotated until the space once occupied by magnet 512M is again positioned at top-dead-center where the installation/replacement tool is located, and then relocked. After wind turbine 404 has been relocked, magnet installation/removal tool 704, now loaded with new magnet 720, is again temporarily connected to rotor 504. Then, magnet insertion/withdrawal mechanism 716 is actuated to push new magnet 720 into rotor 504. After new magnet 720 is securely within rotor 504, magnet installation/removal tool 704 is disconnected. Wind turbine 404 can now be unlocked and rotated as desired, for example, for removing another one of magnets 512A-Q, for removing of magnet installation/removal tool 704 from nacelle 708, for removing crane 700 from the wind turbine, or for some other task.

Figure 8:
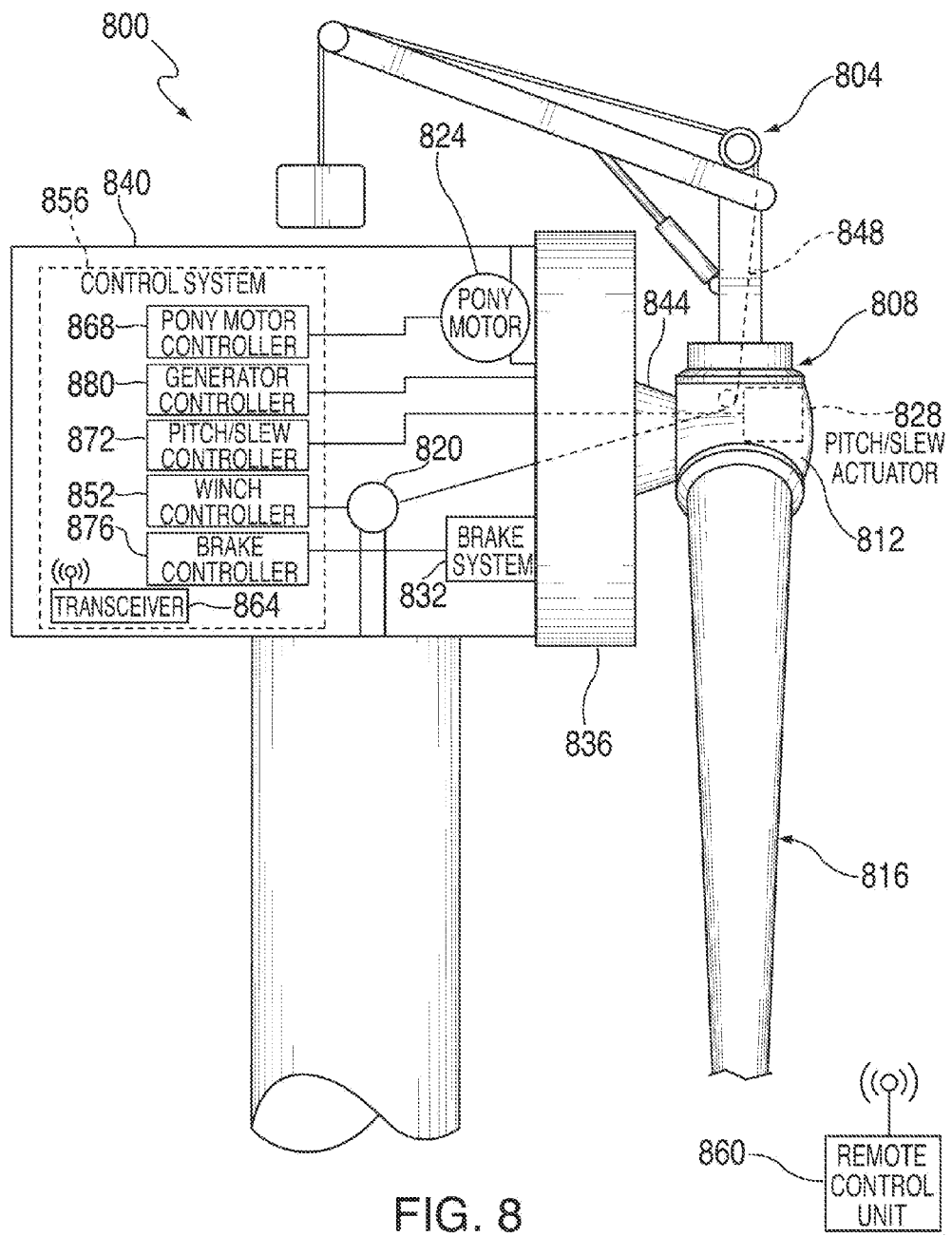
FIG. 8 is a side elevational/diagrammatic partial view of a WPU configured with specially configured controllers for utilizing a wind-turbine-mounted service device.

FIG. 8 illustrates a WPU 800 that includes systems specially designed and/or adapted so that the WPU can readily accommodate a wind-turbine-mounted service device, here, a boom-type crane 804 mounted to one of the blade-pitch bearings 808. This is similar to the boom-type crane installation of FIGS. 1-3F. Consequently, details of FIG. 8 not explicitly described can be assumed to be the same as or similar to details described above relative to FIGS. 1-3F. In addition, any one or more of the systems described in connection with WPU of FIG. 8 can be implemented in WPU 100 of FIG. 1 or any other WPU that implements the broad concepts of the present disclosure, such as WPU 400. It is further noted that while the service device of FIG. 8 is illustrated as being boom-type crane 804, it should be recognized that the service device can be any other suitable service device. For example, boom-type crane 804 could be replaced by a generator service tool, such as stator module installation/removal tool 600 of FIG. 6, among others.

As seen from the foregoing descriptions of FIGS. 1-7, functions that need to be performed in connection with wind-turbine-mounted service devices include: 1) lifting of the service device to a mounting location on hub 812 of wind turbine 816; 2) rotating the wind turbine to the one or more service positions of the service device; 3) rotating the rotor (not shown, but see, e.g., rotor 504 of FIG. 5) to a particular position (see, e.g., FIG. 7 and accompanying text); 4) picking and placing items using the service device; 5) slewing the service device for picking, placing, and other operations; and 6) locking the wind turbine from rotation at appropriate times. To assist in performing these functions, WPU 800 includes the following devices: a winch 820 for assisting with functions 1 and 3; a pony motor 824 for assisting with functions 2 and 3; a pitch/slew actuator 828 for assisting with function 5; and a braking system 832 for assisting with function 6. Regarding functions 2 and 3, although pony motor 824 can perform these functions, it is noted that generator 836 itself can be used as a motor to supplement or complement the pony motor. The use of generator 836 is described below in more detail. However, for even further details, reference can be made to the '779 application, noted above.

In this example, WPU 800 is of a direct-drive configuration in which wind turbine 816 is attached to the rotor of generator 836 by a hollow shaft 844 that, in this example, is large enough so that a person can move through the shaft from inside nacelle 840 and into hub 812. An example of such a configuration is shown in U.S. Pat. No. 7,431,567, titled "WIND TURBINE HAVING A DIRECT-DRIVE DRIVETRAIN," and issued to Bevington et al., on Oct. 7, 2008, which is incorporated herein by reference for its teachings of a drivetrain that allows a person to traverse from a support tower into the hub of a WPU. Consequently, in this embodiment winch 820 is permanently mounted within nacelle 840 and is made part of WPU 800 itself. Winch 820 includes a winch cable 848 that extends through shaft 844 hub 812, and pitch bearing 808 to crane 804. During the process of mounting crane 804 to pitch bearing 808, for example, in the manner depicted in FIGS. 3A-F, winch 820 can be operated to lower the free end of winch cable 848 through an opening in pitch bearing 808 (when the pitch bearing is in the six-o'clock position). The free end of winch cable 848 can then be attached to the base of crane 804, and winch 820 can then be operated to lift the crane to pitch bearing 808 (see, e.g., FIG. 3D), where workers can secure the crane to the pitch bearing. In this example, winch 820 is not only used for installing crane 804, it is also used for picking and placing operations of the crane. To facilitate this, either winch cable 848 itself can be threaded through the crane's sheave system, either before or after lifting crane 804, or the winch cable can be attached to another cable that is pre-threaded threaded through the sheave system.

Winch 820 is controlled by a winch controller 852, which in the example, is part of an overall control system 856 that facilitates control of all aspects of WPU 800, both during times when the WPU is generating electrical power and times when crane 804 is being installed and used. In this example, winch controller 856 is responsive to commands from a human operator (not shown). A remote control unit 860 is provided as a convenient means for the operator to input those commands. In the embodiment shown, remote control unit 860 is a radio-frequency control unit capable of two-way communications with a corresponding transceiver 864 of control system 856, but in other embodiments the communication may be one-way and/or implemented using other wireless or tethered technology. Those skilled in the appropriate art(s) will understand how to implement winch controller 852 and remote control unit 860 so that they have the desired functionality described herein.

In this example, pony motor 824 is fixed to the stator (not shown, but refer to stator 500 of FIG. 5 for an example context) of generator 836 and is drivingly engaged with the generator's rotor. As mentioned above, pony motor 824 can be used alone or in conjunction with generator 836 itself to rotate wind turbine 816 during the processes of installing and removing crane 804 or other service device, to position the service device into its service position(s), and move the rotor of the generator to a desired position, for example, for installing or replacing parts on the rotor, among other things. In this particular embodiment, pony motor 824 is controlled by a suitable pony-motor controller 868 that is part of overall control system 856 and is responsive to input commands from remote control unit 860. Those skilled in the art will readily appreciate how to implement pony-motor controller 868 to achieve the desired functionality.

Pitch/slew actuator 828 serves the dual purpose of pitching one of the blades (the one removed to accommodate crane 804) when WPU 800 is operating and of slewing the crane or other service device when the crane or other service device is being used. Pitch/slew actuator 828 is controlled by a pitch/slew controller 872 that, in this embodiment, may also be considered to be part of overall control system 856. As those skilled in the art know, a conventional pitch-control WPU has a blade-pitch controller. Consequently, one way to implement pitch/slew controller 872 is to modify a conventional blade-pitch controller to include the ability to be responsive to slew commands when WPU 800 is not operating. As with winch and pony motor commands, in this example slew commands are generated at remote control unit 860 in response to corresponding inputs from an operator. Those skilled in the art will readily appreciate how to implement pitch/slew controller 872 to achieve the desired functionality.

In the embodiment shown, WPU 800 includes a braking system 832 like many conventional WPUs. As those skilled in the art understand, a conventional braking system is used during normal operation of a WPU to slow/stop the rotation of the wind turbine during high-wind and other conditions. In WPU 800, however, braking system 832 is controlled by a brake controller 876 that includes the ability to control the braking system in response to braking commands input via remote control unit 860. In this embodiment, brake controller 876 is considered to be part of overall control system 856. Those skilled in the art will readily appreciate how to implement brake controller 876 to achieve the desired functionality.

As mentioned several times above, generator 836 itself can be used as a motor to rotate wind turbine 816 and the rotor of the generator alone or in conjunction with pony motor 824. A conventional direct-drive, permanent magnet WPU typically has a generator controller that controls operation of generator. However, in WPU 800, overall control system 856 includes a generator controller 880 that is configured to control generator 836 as a motor like a stepper motor to precisely control the rotation of wind turbine 816. In this example, motor input commands are provided via remote control unit 860 to allow an operator freedom of movement. The details of generator controller 880 are beyond the scope of the current disclosure, but some details of using a WPU generator as a finely controlled motor can be found in the '[Placeholder A] patent application mentioned above. Again, the pertinent teachings of the '[Placeholder A] patent application are incorporated herein by reference. It is noted that in some embodiments, especially embodiments in which the service device is mounted to one of the blade mounts, the rotational imbalance of the wind turbine may not render it suitable to use the generator alone to make the gross movements between one rotational position and another. In that case, the gross movements can be made using some other means, such as a pony motor, alone or in combination with the generator being used as a motor.

As those skilled in the art will appreciate, aspects of overall control system 856 can be conveniently implemented using a machine (e.g., a computing device) programmed and communicating with other specialized components according to the teachings of the present specification. Appropriate software coding can readily be prepared by persons skilled in the art based on the teachings of the present disclosure, as will be apparent to those of appropriate ordinary skill. Such software may be a computer program product that employs a machine-readable medium. A machine-readable medium may be any medium that is capable of storing and/or encoding a sequence of instructions for execution by a machine (e.g., a computing device) and that causes the machine to perform any one of the methodologies and/or embodiments described herein. Examples of a machine-readable medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as the possibility of including a collection of physically separate media, such as, for example, a collection of compact disks or one or more hard disk drives in combination with a computer memory.

Figure 9:
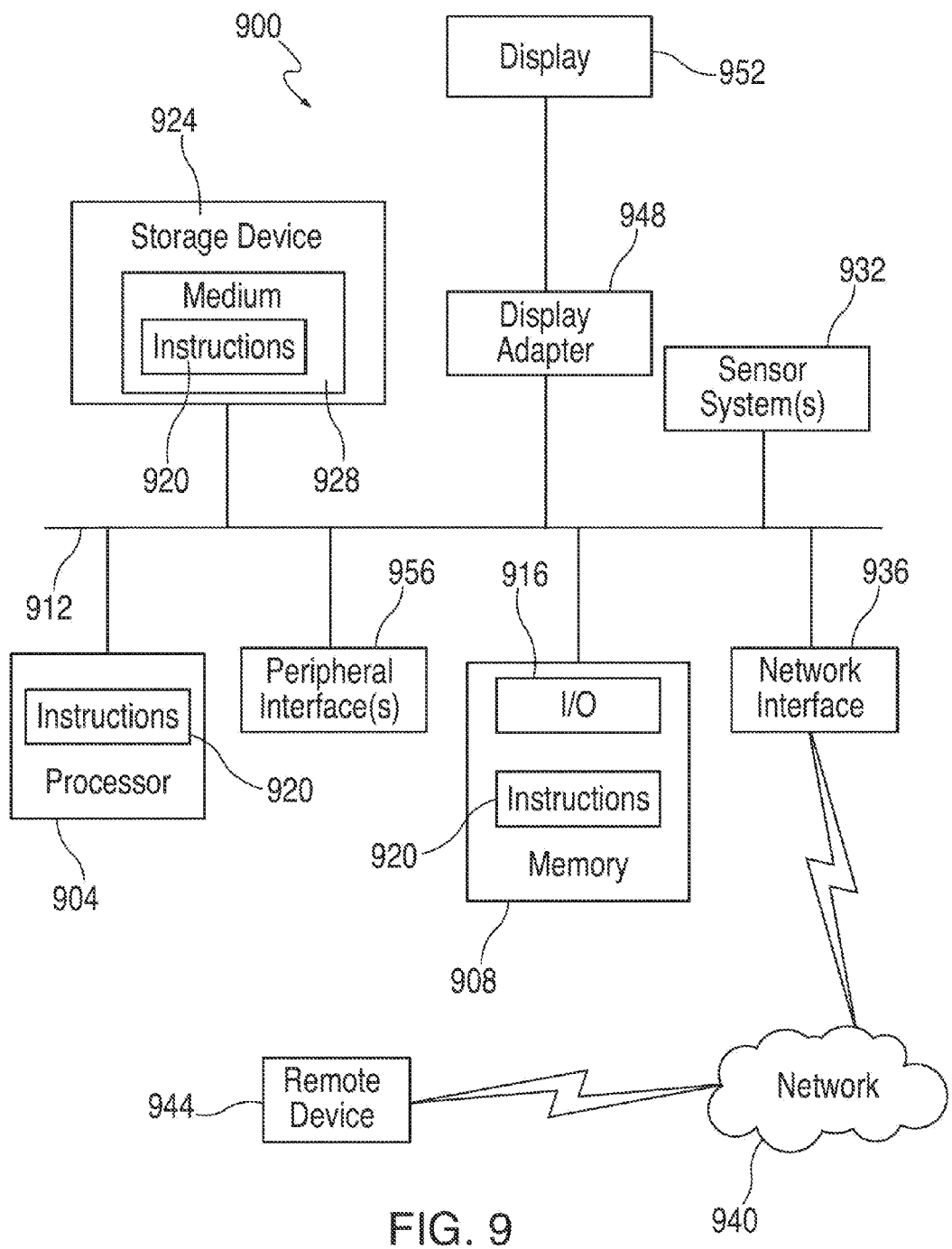
FIG. 9 is a block diagram of a system controller for implementing aspects of the control system of FIG. 8.

Referring now to FIG. 9, and also to FIG. 8, FIG. 9 illustrates an example of a machine/computing device, or "system controller" 900, that can be used to implement a set of instructions for causing one or more controllers of overall control system 856, for example, winch controller 852, pony motor controller 868, pitch/slew controller 872, brake controller 876, generator controller 880, and any other controllers that may be part of the overall control system, to perform any one or more of the aspects and/or methodologies of the present disclosure. System controller 900 includes a processor 904 and a memory 908 that communicate with each other, and with other components, such as winch 820, pony motor 824, pitch/slew actuator 828, braking system 832, generator 836, etc., via a bus 912. Bus 912 may include any of several types of communication structures including, but not limited to, a memory bus, a memory controller, a peripheral bus, a local bus, and any combinations thereof, using any of a variety of architectures.

Memory 908 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 916 (BIOS), including basic routines that help to transfer information between elements within system controller 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

System controller 900 may also include a storage device 924. Examples of a storage device (e.g., storage device 924) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1395 (FIREWIRE), and any combinations thereof. In one example, storage device 924 may be removably interfaced with system controller 900 (e.g., via an external port connector (not shown)). Particularly, storage device 924 and an associated machine-readable medium 928 may provide nonvolatile and/or volatile storage of machine-readable instructions, data structures, program modules, and/or other data for system controller 900. In one example, instructions 920 may reside, completely or partially, within machine-readable medium 928. In another example, instructions 920 may reside, completely or partially, within processor 904.

System controller 900 may also include connections to one or more sensor system 932, such as sensor systems for sensing the rotational position of wind turbine 816, the slew angle of crane 804, among other things. Such sensor system(s) 932, including any analog-to-digital converters that may be needed, can be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Alternatively, in one example, a user of system controller 900 may enter commands and/or other information into the controller via an input device, such as transceiver 864 of FIG. 8, and/or another input device, such as an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, touchscreen, and any combinations thereof.

A user may also input commands and/or other information to system controller 900 via storage device 924 (e.g., a removable disk drive, a flash drive, etc.) and/or a network interface device 936. A network interface device, such as network interface device 936 may be utilized for connecting system controller 900 to one or more of a variety of networks, such as network 940, and one or more remote devices 944 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 940, may employ a wired and/or a wireless mode of communication. In general, any network topology may be used. Information (e.g., data, software 920, etc.) may be communicated to and/or from system controller 900 via network interface device 944.

System controller 900 may further include a video display adapter 948 for communicating a displayable image to a display device 952. Examples of a display device include, but are not limited to, a liquid crystal display (LCD), a cathode ray tube (CRT), a plasma display, and any combinations thereof. In addition to display device 952, system controller 900 may include a connection to components of WPU 800, such generator 836, winch 820, pony motor 824, pitch/slew actuator 828, braking system 832, etc., via one or more other peripheral output interface(s) 956. Examples of a peripheral interface include, but are not limited to, a serial port, a USB connection, a FIREWIRE connection, a parallel connection, a wireless connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A method, comprising:
   lifting a service device to a hub of a horizontal-axis wind turbine;
   mounting the service device to the hub;
   rotating the hub to move the service device to a rotational service position;

immobilizing the rotor hub so that the service device is fixed in the rotational service position; and prior to said mounting, removing a wind-turbine blade from the hub to free-up a blade mount, said mounting including connecting the service device to the blade mount;

wherein the blade mount includes a pitch-bearing assembly and said mounting includes securing the service device to the pitch-bearing assembly, the method further comprising using a blade-pitch-control system to effect slewing of the service device.

2. A method according to claim 1, wherein the service device comprises a crane that includes a boom and the pitch-bearing assembly has a blade-pitch rotational axis, said using the blade-pitch-control system includes using the blade-pitch-control system to pivot the boom about the blade-pitch rotational axis.

3. A method according to claim 1, wherein the service device includes a stator module removal/installation tool for removing/installing a stator module from/to a wind-power-unit generator mechanically coupled to the horizontal-axis wind turbine and the pitch-bearing assembly has a blade-pitch rotational axis, said using the blade-pitch-control system includes using the blade-pitch-control system to pivot the stator module removal/installation tool about the blade-pitch rotational axis from a stator module removal/installation position to a stator module hoisting/lowering position that is different from the stator module removal/installation position.

4. A method according to claim 1, further comprising, prior to said lifting, rotating the hub so that a service device mount is at a six-o'clock position, wherein said lifting and said mounting are performed while the service device mount is at the six-o'clock position.

5. A method according to claim 1, wherein the hub includes a saddle region located between a pair of adjacent wind-turbine blades and said mounting includes mounting the service device substantially within the saddle region.

6. A method according to claim 1, wherein the horizontal-axis wind turbine is mechanically coupled to a wind-power-unit generator and said rotating comprises rotating the hub using the wind-power-unit generator as a motor.

7. A method, comprising:
lifting a service device to a hub of a horizontal-axis wind turbine;
mounting the service device to the hub;
rotating the hub to move the service device to a rotational service position; and
immobilizing the rotor hub so that the service device is fixed in the rotational service position;
wherein the service device is a crane.

8. A method according to claim 7, wherein the crane has a lifting capacity of at least 4000 pounds (approximately 1820 kilograms).

9. A method according to claim 8, wherein the crane includes a boom and the hub includes a blade pitch-bearing assembly having a blade-pitch rotational axis and said mounting includes securing the crane to the blade pitch-bearing assembly, the method further comprising using a blade-pitch-control system to pivot the boom about the blade-pitch rotational axis.

10. A method according to claim 7, wherein the crane includes a boom having a horizontal reach of at least 16.5 feet (approximately 5 meters).

11. A method, comprising:
lifting a service device to a hub of a horizontal-axis wind turbine;
mounting the service device to the hub;
rotating the hub to move the service device to a rotational service position; and
immobilizing the rotor hub so that the service device is fixed in the rotational service position;
wherein the service device includes a stator module removal/installation tool for removing/installing a stator module from/to a wind-power-unit generator mechanically coupled to the horizontal-axis wind turbine.

12. A method according to claim 11, wherein the hub includes a saddle region located between a pair of adjacent wind-turbine blades and said mounting includes mounting the stator module removal/installation tool substantially within the saddle region.

13. A method according to claim 11, further comprising slewing the stator module removal/installation tool from a stator module removal/installation position to a stator module picking/placing position that is different from the stator module removal/installation position.

14. A method according to claim 11, comprising rotating the hub a plurality of times to move the stator module removal/installation tool to a plurality of service positions corresponding respectively to a plurality of stator module locations on the wind-power-unit generator.

15. A method, comprising:
lifting a service device to a hub of a horizontal-axis wind turbine;
mounting the service device to the hub;
rotating the hub to move the service device to a rotational service position; and
wherein:
said lifting the service device includes running a lifting cable through opening in a service device mount on the hub; and
said lifting the service device further includes lifting the service device with a nacelle-mounted winch.

16. A method for in-situ servicing of a generator of a horizontal-axis wind power unit, comprising:
lifting a service device to a wind-turbine hub of the horizontal-axis wind power unit;
mounting the service device to the wind-turbine hub;
rotating the wind-turbine hub to move the service device to a rotational service position;
immobilizing the wind-turbine hub so that the service device is fixed in the rotational service position; and
servicing the generator using the service device;
wherein said servicing the generator includes using the service device to lift a component of the generator to a generator servicing tool.

17. A method according to claim 16, wherein said using of the service device includes lifting the service device to a permanent magnet installation/removal tool.

18. A method for in-situ servicing of a generator of a horizontal-axis wind power unit, comprising:
lifting a service device to a wind-turbine hub of the horizontal-axis wind power unit;
mounting the service device to the wind-turbine hub;
rotating the wind-turbine hub to move the service device to a rotational service position;
immobilizing the wind-turbine hub so that the service device is fixed in the rotational service position; and
servicing the generator using the surface device;
wherein the generator includes a stator comprising a plurality of stator modules and said servicing the generator includes using the service device to lift one of the plurality of stator modules.

19. A method for in-situ servicing of a generator of a horizontal-axis wind power unit, comprising:
lifting a service device to a wind-turbine hub of the horizontal-axis wind power unit;
mounting the service device to the wind-turbine hub;
rotating the wind-turbine hub to move the service device to a rotational service position;
immobilizing the wind-turbine hub so that the service device is fixed in the rotational service position; and
servicing the generator using the service device;
wherein the generator includes a rotor, having a rotational axis, and a stator comprising a plurality of stator modules slidably engageable with a stator frame in a direction parallel to the rotational axis of the rotor, said servicing the generator including using the service device to slidably engage/disengage one of the plurality of stator modules to/from the stator frame.

20. A wind power unit having a wind turbine hub and being configured for use with a service device that mounts to the wind turbine hub, the wind power unit comprising:
a service device mount on the wind turbine hub;
a lifting system for lifting service device to said service device mount; and
a system controller responsive to commands from a remote control unit so as to control rotation of the wind turbine to:
position said service device mount at a service device lifting position; and
once the service device is secured to the service device mount, position the service device at one or more service positions different from the service device lifting position.

21. A wind power unit according to claim 20, wherein said service device mount is a blade-pitch-bearing assembly and said system controller comprises a pitch/slew controller configured to effect slewing of the service device via said blade-pitch-bearing assembly in response to input from the remote control unit.

22. A wind power unit according to claim 20, further comprising a generator, said system controller including a generator controller configured to operate said generator as a motor to effect rotation of the wind turbine hub to position said service device mount at the service device lifting position and to position the service device at the one or more service positions, wherein said generator controller is responsive to motor commands input via the remote control unit.

23. A wind power unit according to claim 20, further comprising a pony motor and a generator that includes a stator and a rotor, wherein said pony motor drivably engages said rotor, said system controller including a pony motor controller configured to operate said pony motor to effect rotation of the wind turbine hub to position said service device mount at the service device lifting position and to position the service device at the one or more service positions, wherein said pony motor controller is responsive to motor commands input via the remote control unit.

* * * * *